United States Patent [19]

Nyc

[11] Patent Number: 5,025,756
[45] Date of Patent: Jun. 25, 1991

[54] INTERNAL COMBUSTION ENGINE

[76] Inventor: Wladimir Nyc, 1326 Mundy Dr., Jacksonville, Fla. 32207

[21] Appl. No.: 569,840

[22] Filed: Aug. 20, 1990

[51] Int. Cl.$^5$ .............................................. F02B 53/00
[52] U.S. Cl. .............................. 123/18 R; 123/51 R; 123/197 AC
[58] Field of Search .......... 123/18 R, 197 AC, 197 C, 123/51 R, 51 A, 51 B, 45 R, 18 A

[56] References Cited

U.S. PATENT DOCUMENTS

| | | | |
|---|---|---|---|
| 1,473,199 | 11/1923 | Peraza | 123/18 R |
| 1,917,180 | 7/1933 | Zwick | 123/197 R |
| 2,170,213 | 8/1939 | Prew | 123/197 R |
| 3,394,683 | 7/1968 | Erick | 123/51 R |
| 4,127,036 | 11/1978 | Pinto | 123/197 C |
| 4,433,649 | 2/1984 | Shin | 123/197 C |
| 4,907,548 | 3/1990 | Lee | 123/197 C |

FOREIGN PATENT DOCUMENTS 2617905  1/1989  France .............................. 123/18 R Primary Examiner—David A. Okonsky
Attorney, Agent, or Firm—Thomas C. Saitta

[57] ABSTRACT

An internal combustion engine having a set of annular 360 degree cylinders each containing two sets of double-headed pistons. The piston sets reciprocate approximately 45 degrees within said cylinder between two combustion ports located 180 degrees apart. The reciprocal motion of the piston sets is translated to a rotational motion to power a drive shaft by four ratchet and pawl mechanisms connected to circular gear sets. An adjustable combustion cylinder allows the total cubic volume of the engine to be varied according to the power needed at any given time.

12 Claims, 5 Drawing Sheets

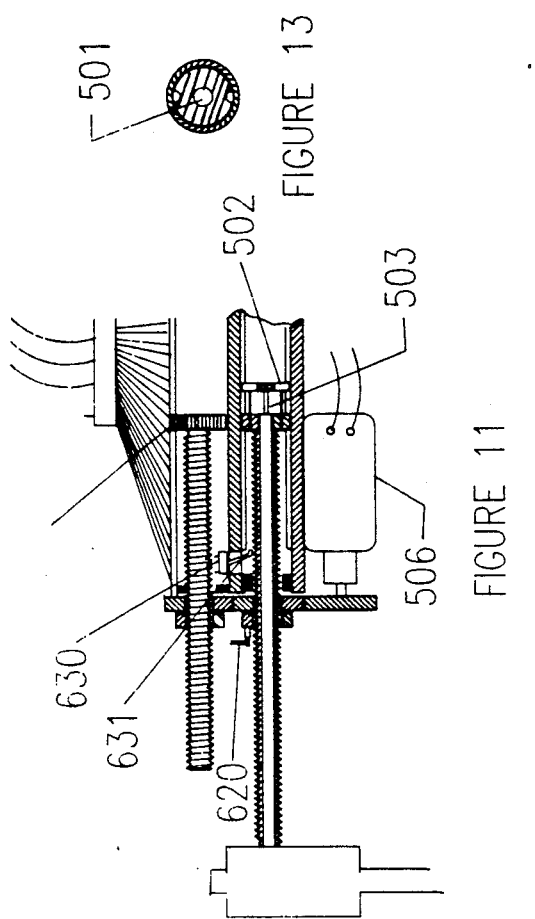
FIGURE 11
FIGURE 13
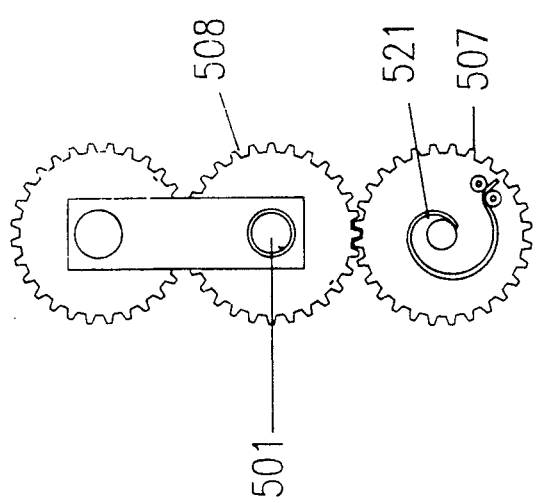
FIGURE 12
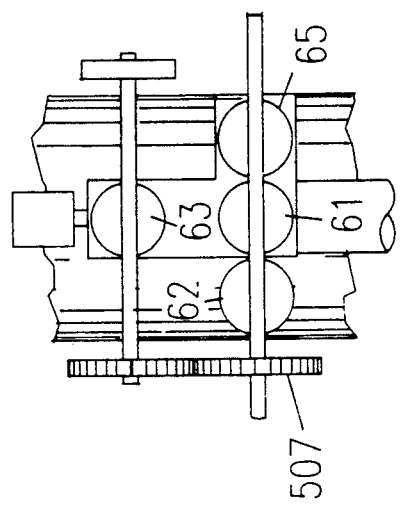
FIGURE 15
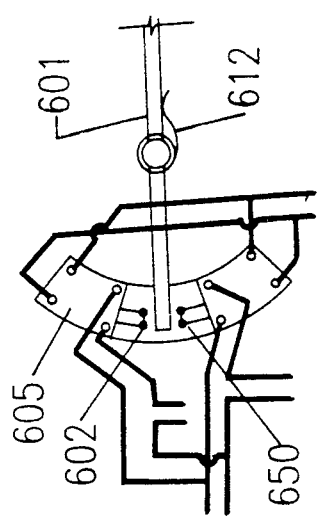
FIGURE 14

INTERNAL COMBUSTION ENGINE

BACKGROUND OF THE INVENTION

This invention relates to the field of internal combustion engines, and more particularly to the field of internal combustion engines having annular cylinders and pistons, where the reciprocal motion of the pistons is transferred to a drive shaft by a rachet and pawl gearing mechanism. Additionally, the invention involves a novel adjustable combustion cylinder where the displacement volume of the combustion chamber can be varied according to the load requirement of the motor at any given time.

The typical internal combustion engine utilizes hollow cylinders, circular in cross-section and linear along the major axis. Pistons reciprocate linearly within these cylinders in response to combustion pressures and shaft rotation, the linear reciprocal motion being transferred to a rotational motion by means of a pivoting, offset connecting rod and crankshaft. This invention differs dramatically from such engines in that here the cylinder is annular, with the pistons traveling a curved reciprocal path. Furthermore, the pistons are arranged in double-headed sets, such that a 360 degree cylinder will contain two piston sets, or a total of four actual pistons.

Engines having curved cylinders are known in the art. For example, Zwick in U.S. Pat. No. 1,917,180 teaches a motor having annular cylinders spanning 180 degrees each, with a quadruple headed piston set reciprocating within the cylinders. A central spoke connects the opposite sides of the piston set and is used to transfer the reciprocating motion to a rotating shaft. In one embodiment, the transfer is by way of a frictional clutch mechanism. In another embodiment, the cylinders themselves rotate and this movement is transferred to the rotating shaft.

Likewise, Prew in U.S. Pat. No. 2,170,213 teaches an internal combustion engine having annular cylinders divided into three chambers with curved double-headed piston sets in each chamber. In various embodiments, different structures are fixed, reciprocating or rotating to transfer the combustion energy into rotational motion.

The structure of the invention at hand is not related to either of the structures referred to above, in that the invention involves one or more fixed annular cylinders having reciprocating double-headed piston sets, each of the two piston sets within a cylinder reciprocating in opposite directions. The reciprocating motion is transferred to a rotating shaft by the use of inter-engaging rotating gears and rachet/pawl mechanisms. Additionally, the combustion chamber for the motor is not fixed in size but is variable in response to load conditions on the motor and desired power output for particular driving situations.

BRIEF SUMMARY OF THE INVENTION

The invention comprises an internal combustion engine having preferably two annular 360 degree cylinders, aligned parallel to each other on a common central axis, each cylinder being a circular tube containing two double-headed piston sets. Each piston set comprises two piston heads, curved to match a segment of a circle to correspond to the cylinder curvature, connected by a piston shaft. The arc from one outer piston surface to the opposing outer piston surface covers approximately 135 degrees. The cylinder is sectioned off by four transverse internal stop walls allowing approximately 45 degrees of piston motion. The piston shaft is connected to either an external pawl sleeve or an internal pawl shaft by a radial arm. The pawl sleeve surrounds the pawl shaft, and both are parallel and centered on the central axis of the cylinders. Pawls connected to the pawl shaft and pawl sleeve turn ratchets mounted directly to circular gears, the gears being mounted on bearings around the pawl sleeve and pawl shaft so as to be free turning except by action of the pawl on the ratchet. The gears are either in sets of two or three as required to transfer the motion to the drive shaft in a single rotational direction.

Valves for combustion, fuel intake, and exhaust are located at opposite 180 degree positions on each cylinder. The two piston sets in a cylinder reciprocate in synchronization, but in opposite directions, so that when one piston set is descending the other piston set is also descending. The piston sets are not connected to one another. A single combustion event creates pressure on both piston sets at the same time. The piston radial arms transfer 45 degrees of motion through the pawls to the ratchets, which turn the gears and the drive shaft. Just before the piston sets have reached the stopping points, a combustion event at the 180 degree position likewise transfers 45 degrees of motion through different pawls and ratchets to the drive shaft while the pistons are returned to the original position.

A conduit system controls the movement of the compressed air caused by the piston movement within the cylinders, directing it into the combustion cylinders to purge burnt gases and provide fresh air for mixture with the fuel. Apertures allow air to exit from the backside of the pistons into air escape tubes when the pistons approach a stop wall. Apertures in the stop walls allow entry of air to prevent a vacuum when the pistons recede from a stop wall. The compressed air is passed through the air escape tubes and into the combustion chamber to force out burnt gases and provide fresh air for mixture with the fuel, this air having sufficient pressure to cause ignition of diesel fuel because of the actions of the piston sets. The combustion cylinders themselves are variable in size to create a motor having a variable displacement volume. When greater power is needed, the combustion chamber is increased in size, and when less power is needed, the chamber is decreased. A small motor coacts with a threaded pipe to move a wall of the combustion cylinder to adjust the volume. The variable cylinder movement is controlled by the motion of the accelerator pedal. The fuel quantity is controlled by a computer which is sensitive to the volume of the combustion chamber at all times. The computer also times the valves for combustion.

BRIEF DESCRIPTION OF THE DRAWINGS

FIG. 11 is a cross-sectional view of one end of the variable combustion cylinders.

FIG. 12 is an end view of the motor, gears and shock absorbing spring taken along line XII—XII of FIG. 11.

FIG. 13 is a cross-sectional view of the moving pipe in the combustion cylinder.

FIG. 14 is a schematic representation of the volume control mechanism for the variable displacement chamber.

FIG. 15 is a top view of a portion of a main cylinder showing the valves and camshaft.

DETAILED DESCRIPTION OF THE INVENTION

The invention is a novel and unique internal combustion engine structure adaptable for diesel or gasoline applications. The pressure caused by ignition of a fuel and air mixture in a combustion chamber moves pistons within an annular cylinder structure. Combustion occurs at opposite points of the cylinder structure so that the pistons, which are connected in pairs, reciprocate over a given arc length. The reciprocating piston motion is transferred to rotate a drive shaft by a number of ratchet/pawl mechanisms and connected circular gears.

Figure 1:
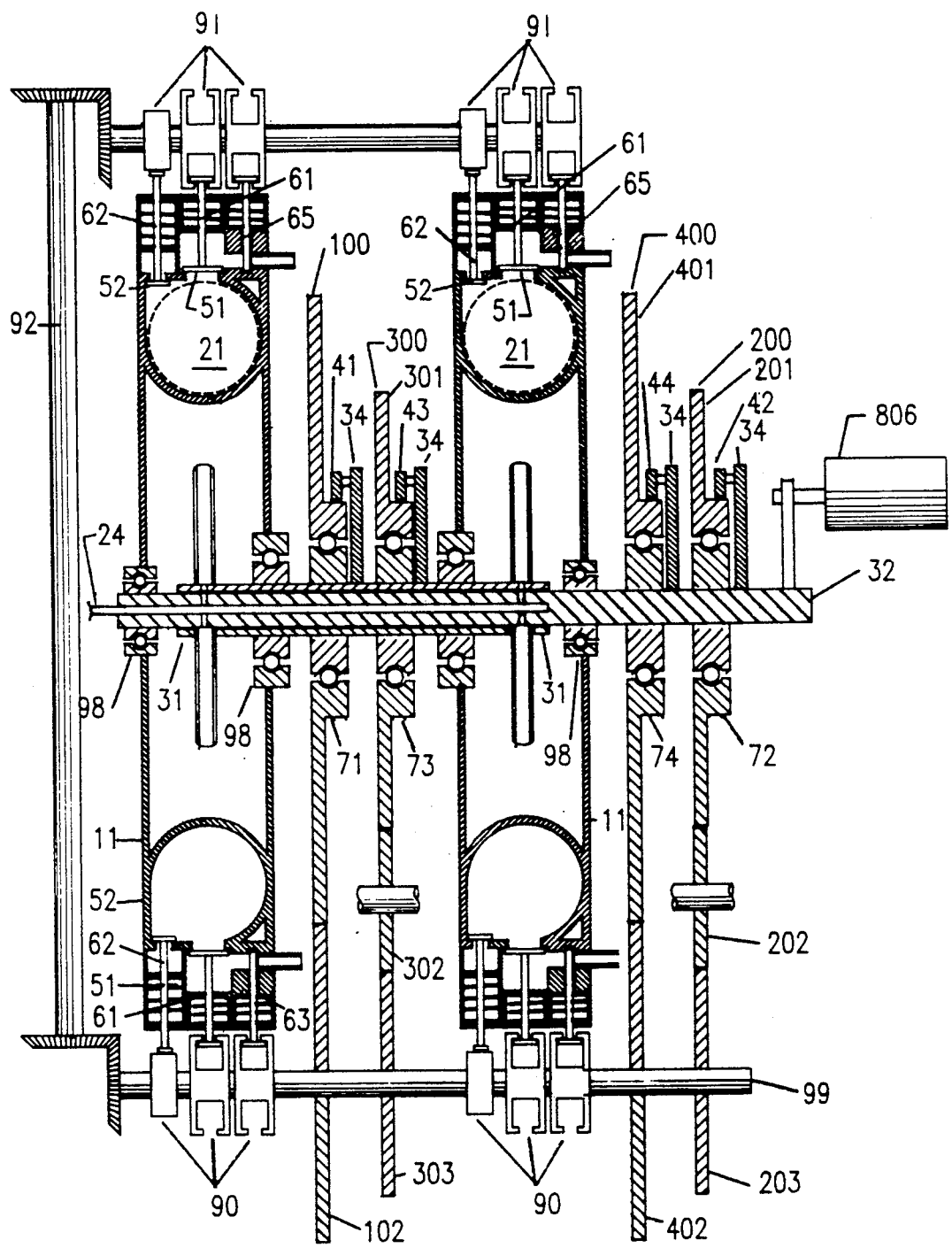
FIG. 1 is a cross-sectional view showing the annular cylinders and partially exposed piston sets, taken along a plane containing the central axis and bisecting the cylinders.

With reference now to FIG. 1, the overall structure of the cylinders 10 and piston sets 20 is illustrated. This overall structure is fixedly mounted in the conventional manner to a housing by brackets or other known means, not shown, to provide power through the drive shaft 99. Each cylinder structure 10 is an annular tube encompassing 360 degrees, the cylinder walls 11 forming a pathway and chamber for movement of the piston sets 20. The cylinders 10 are aligned parallel to each other on a central common axis. The cylinder structure 10 has combustion ports 51 located directly opposite each other on the cylinder walls 11. The combustion ports 51 are the apertures allowing the pressure from the fuel ignition to operate against the piston heads 21. For purposes of discussion, the combustion ports 51 will be designated as being located at the 0 degree and 180 degree positions on the cylinder structure 10, with the 0 degree position taken to be at the top of the cylinder structure 10 as illustrated and the degrees being measured clockwise. A piston set 20 comprises two piston heads 21 facing in opposite directions and connected to each other by a curved piston shaft 22. The distance between the outer sides of piston heads 21 covers approximately 135 degrees. A radial arm 23 extends from the midpoint of the curved piston shaft 22 towards the central axis of the cylinder structure 10. In a given cylinder structure 10, one radial arm 23 will be connected to an external pawl sleeve 31 and the radial arm 23 of the other piston set 20 will be connected to an internal pawl shaft 32. The radial arms 23 extend through radial arm slots 12 in the inner cylinder wall 11. Stop walls 13 are positioned within the cylinder walls 11 to allow 45 degrees of movement of the piston sets 20. Stop walls 13 are centrally apertured to allow free travel of the curved piston shafts 22. Oil passages 24 in shafts 32, radial arms 23, curved piston shafts 22 and piston heads 21 allow lubricating oil to be pumped to lubricate the piston movement against the cylinder walls 11.

The two piston sets 20 contained within a cylinder structure 10 reciprocate in opposite directions, such that when one piston set 20 is moving clockwise, the other piston set 20 is moving counter-clockwise. The two piston sets 20 are synchronized such that the corresponding piston heads 21 from each piston set 20 will approach each other at the 0 degree position at the same time during the operating cycle. Likewise, the opposing piston heads 21 of the two piston sets 20 will approach each other at the 180 degree position at the same time at a later point in the operating cycle. The two piston sets 20 move in a reciprocating motion along a 45 degree arc, this motion being transferred to the pawl sleeve 31 and pawl shaft 32 by the radial arms 23.

Figure 8:
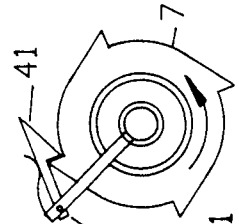
FIG. 8 is a view of a ratchet returned to the starting position.
Figure 7:
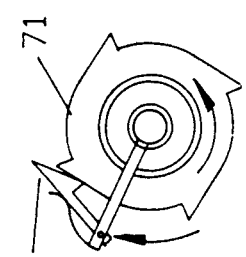
FIG. 7 is a view of a ratchet returning to the starting position.
Figure 5:
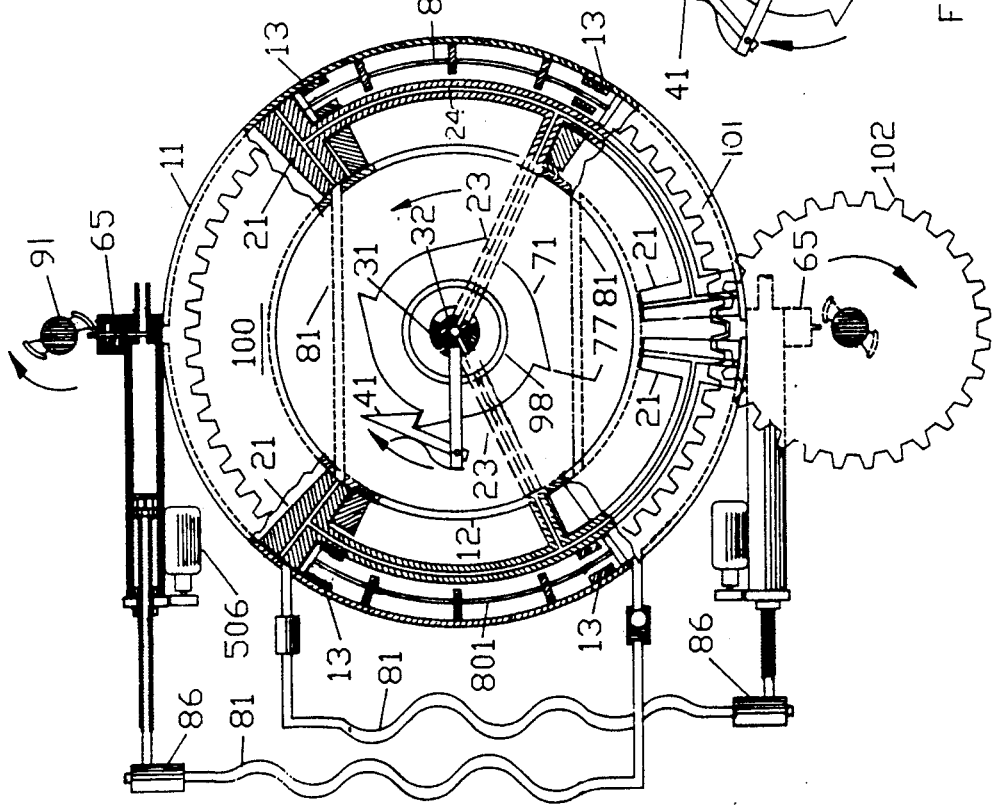
FIG. 5 is a partially exposed view of a twin gear mechanism and the variable combustion cylinders, taken at the finish of a descending cycle for the piston set of FIG. 2.
Figure 10:
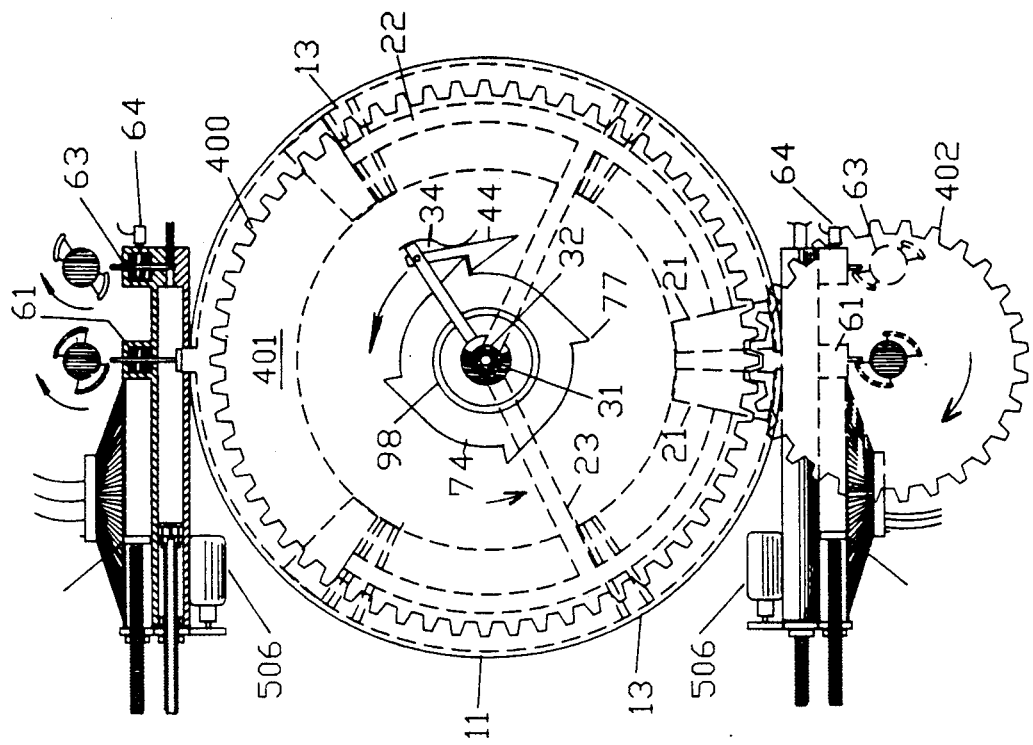
FIG. 10 is a partially exposed view of a twin gear mechanism and the variable combustion cylinders, taken at the start of an ascending cycle for the piston set of FIG. 3.

The transfer mechanism for translating the reciprocating motion of the piston sets 20 within the cylinder structure 10 into a rotational force to the drive shaft 99 involves the use of rachet and pawl sets, as shown in FIGS. 7 and 8. Centered on the central axis of cylinder 10 is pawl shaft 32, which is mounted on bearings 98 so as to freely rotate. Pawl sleeve 31 surrounds pawl shaft 32 and is separated from it by bearings 98 so that it may rotate independently and in the opposite direction of pawl shaft 32. Within the cylinder structure 10, one radial arm 23 attaches to the pawl sleeve 31 and the other radial arm 23 attaches to the pawl shaft 32. Radial arms 23 rotate independently and in opposite directions to each other at all times.

Two pivoting pawls 41 and 43 are mounted on two pawl arms 34, which are fixedly attached to the external pawl sleeve 31. Likewise, two additional pivoting pawls 42 and 44 are mounted on pawl arms 34 which are attached to the internal pawl shaft 32. In this manner, as the piston sets 20 reciprocate, the motion is transferred to the pawl shaft 32 and the pawl sleeve 31, which in turn move the pawl arms 34 in a rocking motion. Pawl 41 is mounted in the opposite direction of pawl 43, and pawl 42 is mounted in the opposite direction of pawl 44. There are four gear sets 100, 200, 300 and 400, one such set being associated with each of pawls 41, 42, 43 and 44. Each set is centered on the central axis and mounted on bearings 98 to allow for independent rotation around the pawl sleeve 31 and pawl shaft 32.

With further reference now to FIGS. 3 through 6, 9 and 10, the gear sets are better illustrated. Gear set 100 comprises two inter-engaging circular gears 101 and 102 having teeth 111 on the perimeters, and gear set 400 comprises two inter-engaging circular gears 401 and 402 having teeth 111 on the perimeters. Gear set 200 comprises three inter-engaging circular gears 201, 202 and 203 having teeth 111 on the perimeters, and gear set 300 comprises three inter-engaging circular gears 301, 302 and 303 having teeth 111 on the perimeter. Gears 101, 201, 301 and 401 are centered around the central axis of the cylinders 10, separated from the external pawl sleeve 31 or internal pawl shaft 32 by bearings 98 so as to be free-turning. Gears 101, 201, 301 and 401 are directly attached to ratchets 71, 72, 73 and 74, respectively, the ratchets and gears sharing a central axis. Each ratchet 71, 72, 73 and 74 has four teeth 77 mounted on the perimeter 90 degrees apart to engage with pawls 41, 42, 43 and 44. Ratchets 71 and 74 engage in the opposite direction from ratchets 72 and 73.

Because the motion of the piston sets 20 is a reciprocating motion, the movement will alternate between clockwise and counter-clockwise, encompassing a 45 degree arc. The external pawl sleeve 31 and the internal pawl shaft 32 will be reciprocated likewise, thus reciprocating the individual pawls 41, 42, 43 and 44. The reciprocating motion is continuously transferred because each individual stroke of a piston set 20 operates two pawls, one pawl engaging a ratchet while the other is disengaged. On the return stroke of the particular piston set 20, the first pawl is now disengaged while the latter pawl is engaged and turning a ratchet.

Figure 2:
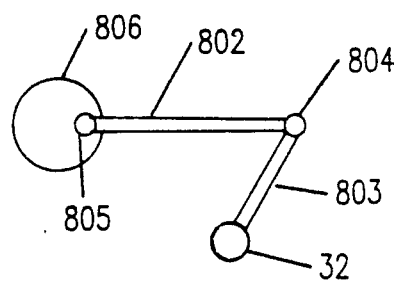
FIG. 2 is an end view showing the offset connection of the starter motor to the pawl shaft.
Figure 4:
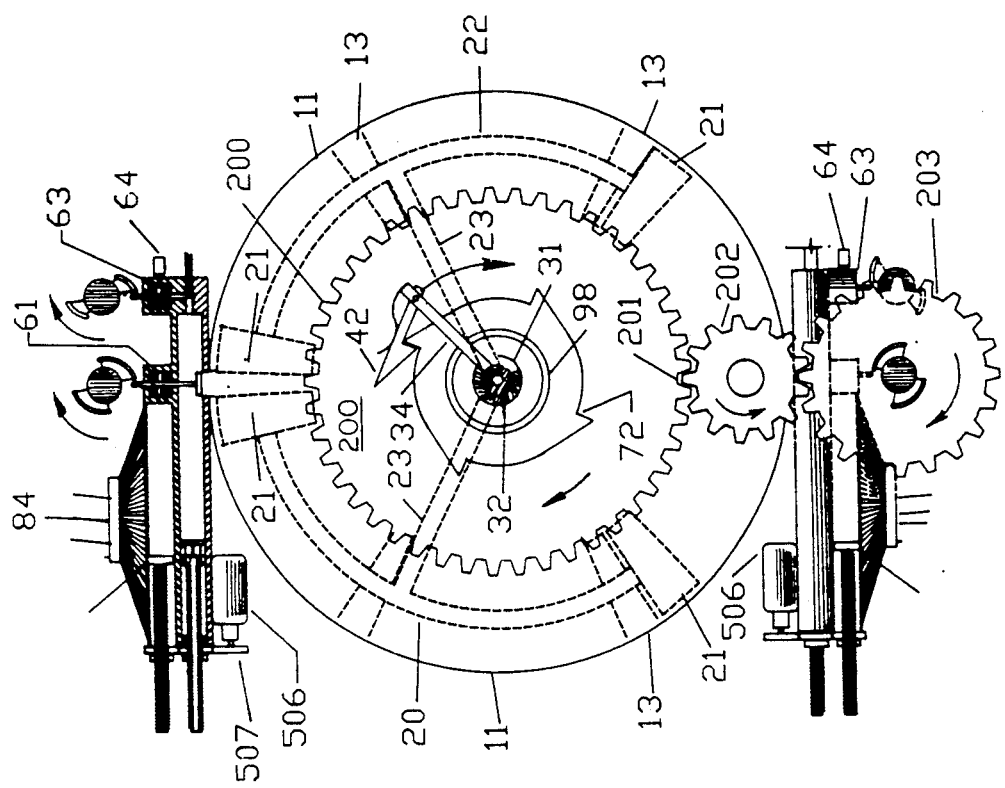
FIG. 4 is a partially exposed view of a triple gear mechanism and the variable combustion cylinders, taken at the start of a descending cycle for the opposite piston set of FIG. 2.
Figure 3:
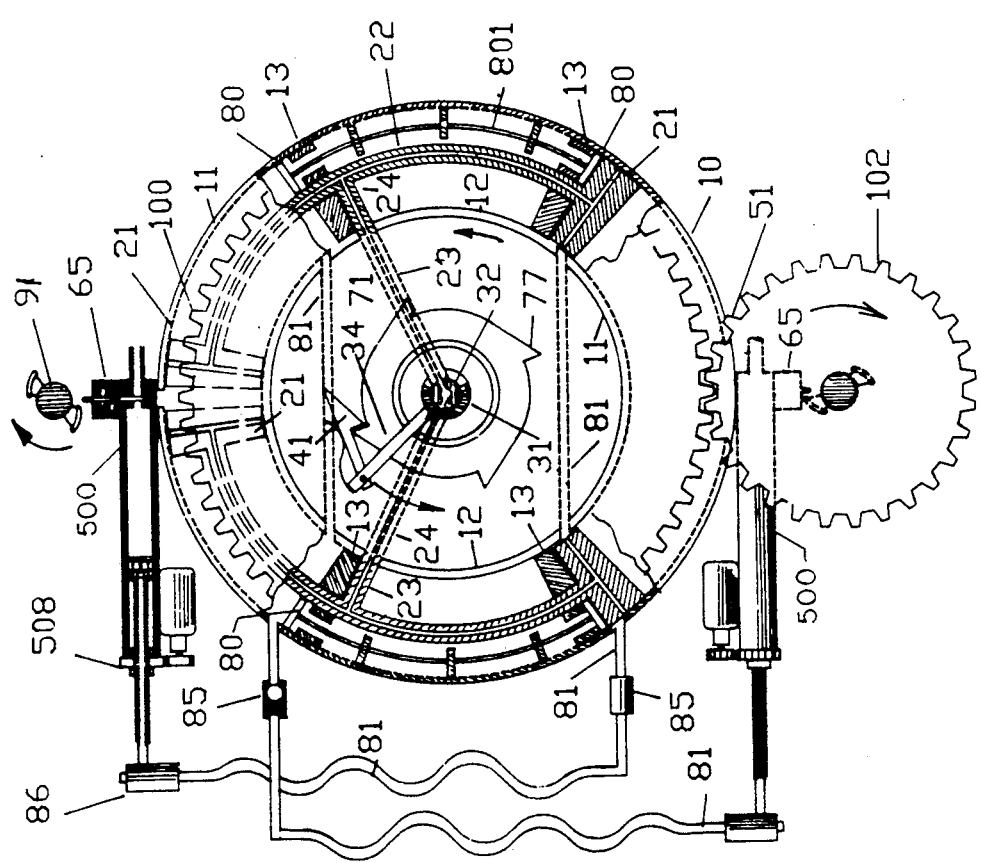
FIG. 3 is a partially exposed view of a twin gear mechanism and the variable combustion cylinders, taken at the start of a descending cycle for one piston set.
Figure 6:
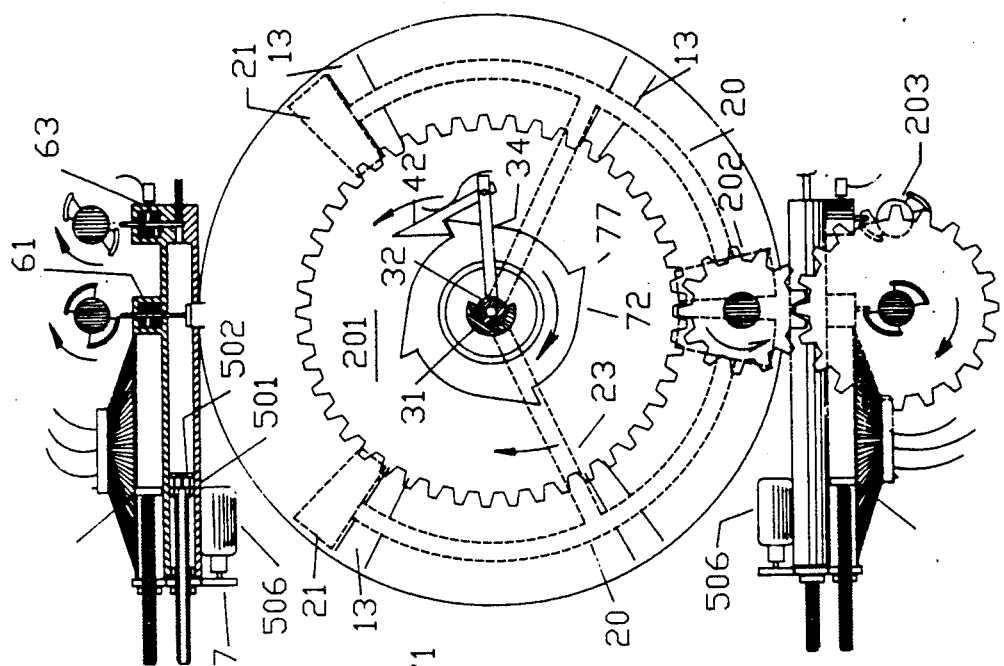
FIG. 6 is a partially exposed view of a triple gear mechanism and the variable combustion cylinders, taken at the finish of a descending cycle for the piston set of FIG. 3.
Figure 9:
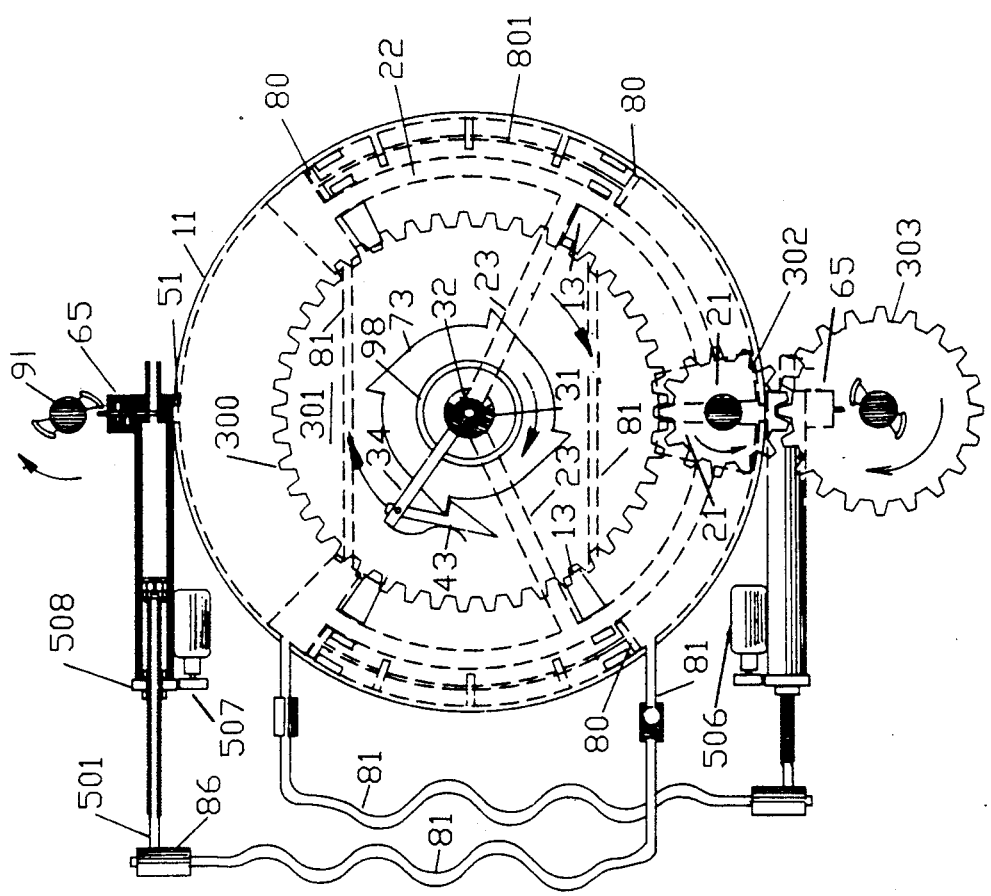
FIG. 9 is a partially exposed view of a triple gear mechanism and the variable combustion cylinders, taken at the start of an ascending cycle for the piston set of FIG. 2.

The piston set 20 connected to the external pawl sleeve 31 operates pawls 41 and 43. As these two pawls face oppositely, the corresponding ratchets 71 and 73 engage in opposite directions. Thus, when the piston sets 20 are in the down stroke due to combustion of the fuel and air mixture forcing its way from the combustion chamber through combustion port 51 at the 0 degree position, the external pawl sleeve 31 is rotated, and pawl 41 is engaged with a tooth 77 of ratchet 71, transferring power to gear set 100, as seen in FIG. 3. During this same down stroke, pawl 43 is disengaged from ratchet 73, returning to the engagement position. When the piston sets 20 are in the up stroke due to the combustion of the fuel and air mixture forcing its way through combustion port 51 at the 180 degree position, the external sleeve 31 is rotated back in the opposite direction, and pawl 41 is disengaged from ratchet 71, while pawl 43 is now engaged with a tooth 77 of ratchet 73, transferring power to gear set 300, as seen in FIG. 9. Concurrently with this action, the other piston set 20 is reciprocating the internal pawl shaft 32. Pawls 44 and 42 and ratchets 74 and 72 engage in opposite directions. In the downstroke, pawl 42 is engaged with a tooth of ratchet 72, transferring power to gear set 200, as in FIG. 4, while pawl 44 is disengaged from ratchet 74. In the up stroke, pawl 44 is engaged with a tooth of ratchet 74, transferring power to gear set 400, as in FIG. 10, while pawl 42 is now disengaged from ratchet 72. Because ratchets 71 and 72 rotate in one direction and ratchets 73 and 74 rotate in the other, gear sets 200 and 300 require an extra gear 202 and 302 to translate the rotation into the same direction as that of gear sets 100 and 400. Thus, all of the rotational motion is transferred to the drive shaft 99 in a single direction. The above cycles are illustrated in FIGS. 2 through 15.

A given power stroke rotates the pawl and ratchet 45 degrees. During the return stroke, the pawl will be returned 45 degrees to its original position. At the same time, the ratchet is rotated the additional 45 degrees to bring the next tooth into position by the action of the corresponding power stroke of the opposite direction. This opposite power stroke has rotated the drive shaft 99 another 45 degrees through a different gear set, and this additional rotation is carried back through the first gear set to rotate the ratchet the additional 45 degrees. The engine has four cylinders—two at 0 degrees and two at 180 degrees. Ignition occurs every 45 degrees of movement. For two cylinders, the number of ignition cycles is 360 degrees divided by 45 degrees times 2, equaling 16 ignition cycles.

Operation of the internal combustion engine is performed by creating a fuel and air mixture in a combustion chamber, igniting this mixture, exhausting the spent gases and initiating a new cycle. To start the engine, a starter motor 806 moves an off-center shaft 805 to transfer a reciprocating motion through arms 802 and 803 connected by pivot 804 to the internal shaft 32, as seen in FIG. 2. Ports and valves control the ingress and egress of the gases to and from the cylinder structure 10. Groupings of ports and valves are located at the 0 degree and 180 degree positions of the cylinder wall 11, since the double headed piston sets 20 require two sets of combustion at opposite points to create the reciprocating motion. An exhaust port 52 and exhaust valve 62 allow the burnt mixture to be expelled by motion of the piston sets 20 during the return stroke. Fuel valve 63 is lifted by a cam 90 and held by a computer controlled solenoid. Fuel comes into contact with air and ignition occurs in the combustion chamber and moves through combustion port 51 into cylinder structure 10 to force the piston set 20 into motion. The quantity of fuel is precisely metered by the computer so that all available fuel in the variable combustion chamber is completely burned and fuel valve 63 is closed. After a 45 degree cycle, valve 61 is closed. Cams 90 are positioned on drive shaft 99 to operate the valve grouping at the 180 degree position and cam shaft 91 operates the valve grouping at the 0 degree position. A connecting rod 92 or timing belt is used to transfer the rotation of the drive shaft 99 to the cam shaft 91.

It is necessary to provide escape means for air between the piston heads 21 and the stop walls 13. As a given piston head 21 approaches the stop wall 13, the air between the piston head 21 and stop wall 13 is compressed and exit means must be provided to allow this air to escape. To accomplish this task, an air escape tube 81 is positioned adjacent each stop wall 13 in the cylinder wall 11. Air escape tube 81 conducts the compressed air through a one-way check valve 85 through pressure regulator valve 86. Air escape tube 81 is positioned a small distance from stop walls 13, such that a small amount of compressed air is trapped between stop wall 13 and piston head 21 to prevent contact between the two and to provide a shock absorbing cushion. Regulator valve 86 maintains precisely the correct pressure for maximum combustion efficiency. Each stop wall 13 is apertured and a moving cover 80 is matched to each aperture. Cover 80 operates to close the aperture when the air behind the piston head 21 is being compressed, such that the only means of egress is through the air escape tube 81. When the piston head 21 is receding from the stop wall 13, the vacuum from the receding piston head 21 and the pressure from the approaching piston head 21 opens cover 80, allowing fresh air to be drawn into the area through the slot 12 in the cylinder wall 11. A connecting rod 801 connects opposite pairs of covers 80 to one another, so that the opening and closing of each cover 80 over the apertures in the stop walls 13 is synchronized and assisted by the opposite pressure situation, of the corresponding piston head 21, such that the closing of one cover 80 acts to open the corresponding cover 80, and vice-versa.

The combustion cylinders 500 are hollow cylinders into which the fuel is dispersed to mix with air for combustion. The combustion cylinders of the invention are unique in having an internal moveable wall, shown in FIG. 11, such that the internal volume of the cylinder can be varied according to the power requirements of the motor. There are two combustion cylinders 500 for each cylinder 10, each combustion cylinder 500 corresponding to the 0 degree and 180 degree positions of the combustion ports 51. Combustion port 51 is the connecting port between the combustion cylinder 500 and the interior of the cylinder 10. An externally threaded hollow pipe 501 is mounted such that a small motor 506 can alter the lateral position of the pipe 501 within the cylinder 500, thus adjusting the internal volume of combustion cylinder 500. Motor 506 turns a motor gear 507 mounted on a shock absorbing spring 521, which turns an internally threaded pipe gear 508, as shown in FIG. 12. Pipe 501 is threaded within this pipe gear 508. When greater power is required, the pipe 501 is moved laterally to create a larger volume within combustion cylinder 500. When less power is needed, pipe 501 is moved farther into cylinder 500 to create less volume.

Pipe 501 is hollow and is connected on its outer end to an air escape tube 81. The interior end of pipe 501 has a cover piston head 502 mounted on piston rods 503. The combination of the end of pipe 501 and cover piston head 502 form the moveable wall within the combustion cylinder 500. Cover piston head 502 responds to pressure to either open or close the internal end of pipe 501. Thus, when combustion occurs within the combustion cylinder 500, the pressure forces cover piston head 502 against the opening of pipe 501, sealing it off so that the only escape for the combustion pressure is into the cylinder 10 through the combustion port 51 to operate the piston sets 20. When no combustion event is occurring, the pressure of the compressed air in air escape tube 81 is sufficient to force the cover piston head 502 away from the opening, allowing the fresh air to purge the burnt gases from the combustion chamber 500 through air valve 65, which closes before the end of the cycle. Pressure regulator valve 86 insures constant air pressure in the combustion chamber.

The flow of fuel into the combustion cylinder 500 is controlled by a mini-computer. The volume of the combustion chamber is controlled by the accelerator pedal itself. The volume of the cylinder 500 is a function of the movement of the pedal, such that movement to create acceleration or more power results in motor 506 moving pipe 501 outwardly to make a combustion cylinder 500 with larger cubic volume, while movement of the pedal to decelerate or coast results in inward movement of pipe 501 to create a smaller cubic volume. No change in combustion cylinder 500 volume occurs during steady speed driving. A shock absorbing spring allows motor 506 to operate against the spring during the moment of combustion so that the motor 506 is not harmed by the intense pressure build-up in the chamber. After combustion, the motor 506 can then continue to drive the pipe 501 if needed.

The volume control device of FIG. 14 is shown in the initial position for minimum displacement volume in chamber 500. Pressure regulator 86 housing is in contact with minimum displacement limit switch 620 so that electrical current to motor 506 is disconnected. When accelerator pedal 601 is depressed, potentiometer switch 605 is activated supplying electrical current to motor 506 causing larger displacement volume in cylinder 500 as previously described. This process continues until the desired speed is achieved, then accelerator pedal 601 is released to the middle position, disconnecting switch 602 and thus cutting the electrical supply to motor 506. In the event that cylinder 500 reaches the maximum displacement volume, the end of piston pipe 501 contacts maximum displacement limit switch 630 so that electrical current to motor 506 is disconnected. If a slower speed is desired, the accelerator pedal 601 is further released, engaging switch 650, which provides electrical current to motor 506 in the opposite polarity, thus causing the volume of cylinder 500 to decrease. Again, when the desired speed is reached the pedal 601 is depressed and held constant. Any desired speed can be maintained while the optimum displacement volume is provided. The rate of increase or decrease in the volume of cylinder 500 is controlled by the extent to which pedal 601 is moved. A slight movement will result in a slower rate of change. A greater movement will result in a faster rate of change. When the accelerator pedal 601 is moved, the potentiometer switches 602 and 650 move more slowly than the pedal 601. When pressure is completely removed from accelerator pedal 601, spring 612 causes the accelerator pedal 601 to pivot so that switch 650 is engaged until pipe 501 engages switch 620. Cylinder 500 is now in the minimum displacement position.

Compared to a conventional 8 cylinder motor, this invention with two annular cylinder sets also provides a total of 8 cylinders. The conventional engine has 4 cylinder ignitions during a 360 degree shaft rotation. This engine ignites 4 cylinders every 45 degrees of rotation—a total of 32 ignitions for every 360 degrees of rotation. Assuming the same piston speed and the same BHP in both the existing engine and the new engine, in an existing engine the piston moves 6 inches while the crankshaft turns 280 degrees. However, in the new motor the piston moves 6 inches per 45 degree cycle. Thus the central axis of the new engine rotates 4 times less (180 divided by 45) distance while the power increases by 4 times compared to the existing motor.

For comparison purposes, performance for a typical automobile engine with 8 cylinders generates 48 BHP at 1000 RPM. At 1500 RPM the same engine generates 72 BHP. At a maximum 4,000 RPM, it generates 118 BHP (taken from Encyclopedia Britannica "Performance Curves for Typical Automobile Engines").

The new motor has 2 annular 360 degree cylinder sets on the common central axis; each has 4 cylinders, inside which 2 cylinders ignite simultaneously. At maximum volume in cylinder 500 (of FIGS. 3 and 4) and maximum RPM of 250 (1000 divided by 4), each annular cylinder set produces 24 BHP times 4, or 96 BHP. Thus, for one revolution of the central shaft, one piston produces 8 ignitions (360 degrees divided by 45). Since each annular cylinder set has 2 pistons igniting simultaneously, a total of 8 times 2 or 16 ignition cycles for each annular cylinder set. Since there are 2 annular cylinder sets, a total of 16 times 2 or 32 ignition cycles are produces for each 360 degrees rotation of the central axis.

From the above, it can be seen that the new motor has 8 times more ignition cycles than the existing motor (32 divided by 4 equals 8) for each 360 degree rotation. Then, at maximum RPM of 250, the new motor with the same piston speed as existing motors at 1000 revolutions, generates a total of (96 plus 96) times 8, or 1536 BHP. By use of a well known gear box, the final drive shaft rotational speed is increased by 4 times; thus 250 RPM times 4 equals 1000 RPM. Then at 1000 RPM, 1536 divided by 4, or 384 BHP would be generated. For a comparison of an automobile's miles per hour, assume the car's tire is 2.0 feet in diameter. Then for the maximum engine speed of 1000 RPM, the car's speed would be: 2 feet times 3.14 times 1000 RPM times 60 MPH divided by 5,280 ft/mile or 71.4 MPH at the maximum 384 BHP. For a maximum engine speed of 1500 RPM, the car's speed would be: 2 feet times 3.14 times 1500 times 60 divided by 5,280, or 107 MPH at the maximum 256 BHP. This comparison assumes the same gasoline to air mixture in both the old and new engines. In reality, the new engine would utilize an optimum mixture (much richer) and therefore produce more power for the size.

The ratchet and pawl assembly, at the maximum RPM of 250 for the new engine, will operate 4 times 250 equals 1000 upward 45 degree cycles and 1000 downward 45 degree cycles per minute. Cylinders 500 has constant pressure and constant mixture of gasoline and air and changes only volume in cylinder 500. It is possible to make very low revolutions with the same efficiency.

In existing motors at fast revolutions, up to 35% of gasoline is exhausted from the ignition chamber unburned. This increases pollution and reduces efficiency. In the new motor, slower engine rotation and piston speed permits more complete fuel combustion resulting in lower pollution and increased efficiency. The existing motor, having a constant combustion cylinder displacement, is necessarily sized for adequate acceleration nd load requirements. However, this results in an engine about twice as large as is needed for most normal operation requirements. The new motor provides constant pressure and constant optimum efficient mixture of fuel and air in cylinder 500 which the volume of the combustion chamber is adjustable as needed to provide optimum power for any driving condition. This results in a fuel savings of 50 percent or more and a reduction in pollution. The elimination of the crankshaft also increases efficiency. This new motor requires no automatic or manual transmission except for the gear box mentioned above. All speed and power requirements may be performed by variable cylinder 500 through the driver's pedal. This slower motion results in more complete fuel burn off, thus saving fuel and creating less pollution. Furthermore, the slower motion makes acceptable the use of lower grade and less expensive fuel. The advantages of no crankshaft, variable displacement combustion chamber, slower piston velocity and constant ideal air fuel mixture means a fuel savings and pollution decrease of more than 50 percent when compared to a conventional motor.

The above examples and figures are by way of illustration only, and it is understood that substitutions and equivalents may be apparent to those skilled in the art. The full scope and definition of the invention is to be therefore as set forth in the following claims.

I claim:

1. An internal combustion engine comprising: index having combustion ports
   (A) a tubular, annular cylinder having combustion ports positioned 180 degrees apart;
   (B) a first piston set comprising a pair of piston heads connected by a shaft and facing in opposite directions, said first piston set being contained within said annular cylinder between said combustion ports, where said first piston set is adapted to travel in a reciprocating motion within one half of said annular cylinder;
   (C) a second piston set comprising a pair of piston heads connected by a shaft and facing in opposite directions, said second piston set being contained within said annular cylinder between said combustion ports on the opposite side from said first piston set, where said second piston set is adapted to travel in a reciprocating motion within the opposite half of said annular cylinder such that both said first piston set and said second piston set approach one of said combustion ports at the same time;
   (D) a rotating pawl shaft centered on the central axis of said annular cylinder, said pawl shaft having two pawls directly attached and extending radially from said pawl shaft, where the pawls face in opposite directions;
   (E) a rotating pawl sleeve encircling said rotating shaft, said pawl sleeve having two pawls directly attached and extending radially from said pawl sleeve, where the pawls face in opposite directions;
   (F) a first arm connecting said shaft of said first piston set to said pawl shaft;
   (G) a second arm connecting said shaft of said second piston set to said pawl sleeve;
   (H) two double gear sets each having a first gear attached to a ratchet and centered on said central axis, and a second gear engaged with said first gear to transfer motion to a drive shaft, where one ratchet is operated by one of said pawls of said pawl shaft, and the other ratchet is operated by one of said pawls of said pawl sleeve;
   (I) two triple gear sets each having a first gear attached to a ratchet and centered on said central axis, a third gear to transfer motion to said drive shaft, and an intermediate gear engaging said third and first gear, where one ratchet is operated by the second of said pawls of said pawl shaft, and the other ratchet is operated by the second of said pawls of said pawl sleeve;
   where said first piston set and said second piston set reciprocate between said combustion ports, this reciprocal motion being transferred to said pawl shaft and said pawl sleeve by said first and second connecting arms, which in turn translate the reciprocal motion through the engagement of said pawls and said ratchets into a rotational motion turning said gear sets.

2. The device of claim 1, where said pairs of piston heads are separated by an angle of approximately 135 degrees.

3. The device of claim 1, where each of said piston sets reciprocates approximately 45 degrees.

4. The device of claim 1, further comprising a combustion cylinder having a variable internal volume connected to each of said combustion ports.

5. The device of claim 4, where said combustion cylinder comprises a positionable end wall contained within a hollow cylinder, and where said device further comprises means to move said end wall.

6. The device of claim 5, where said means to move said end wall comprises a motor, an internally threaded gear and an externally threaded pipe connected to said end wall, where said motor is connected to said internally threaded gear to turn said internally threaded gear, which then rotates said externally threaded pipe.

7. An internal combustion engine comprising:

(A) a pair of tubular, annular cylinders having combustion ports positioned 180 degrees apart, said cylinders aligned parallel to each other and sharing a common central axis;

(B) a pair first piston sets each comprising a pair of piston heads connected by a shaft and facing in opposite directions, said first piston sets being contained within said annular cylinders between said combustion ports, one of said first piston sets in each of said annular cylinders, where said first piston sets are adapted to travel in a reciprocating motion within one half of said annular cylinders;

(C) a pair of second piston set each comprising a pair of piston heads connected by a shaft and facing in opposite directions, said second piston sets being contained within said annular cylinders between said combustion ports on the opposite side from said first piston set, one of said second piston sets in each of said annular cylinders, where said second piston sets are adapted to travel in a reciprocating motion within the opposite half of said annular cylinders such that both said first piston set and said second piston set of each said annular cylinder approach one of said combustion ports at the same time;

(D) a rotating pawl shaft centered on the central axis of said annular cylinders, said pawl shaft having two pawls directly attached and extending radially from said pawl shaft, where the pawls face in opposite directions;

(E) a rotating pawl sleeve encircling said rotating shaft, said pawl sleeve having two pawls directly attached and extending radially from said pawl sleeve, where the pawls face in opposite directions;

(F) a pair of first arms connecting each of said shafts of said first piston sets to said pawl shaft;

(G) a pair of second arms connecting each of said shafts of said second piston sets to said pawl sleeve;

(H) two double gear sets each having a first gear attached to a ratchet and centered on said central axis, and a second gear engaged with said first gear to transfer motion to a drive shaft, where one ratchet is operated by one of said pawls of said pawl shaft, and the other ratchet is operated by one of said pawls of said pawl sleeve;

(I) two triple gear sets each having a first gear attached to a ratchet and centered on said central axis, a third gear to transfer motion to said drive shaft, and an intermediate gear engaging said third and first gear, where one ratchet is operated by the second of said pawls of said pawl shaft, and the other ratchet is operated by the second of said pawls of said pawl sleeve;

where said first piston set and said second piston set reciprocate between said combustion ports, this reciprocal motion being transferred to said pawl shaft and said pawl sleeve by said first and second connecting arms, which in turn translate the reciprocal motion through the engagement of said pawls and said ratchets into a rotational motion turning said gear sets.

8. The device of claim 7, where said pairs of piston heads are separated by an angle of approximately 135 degrees.

9. The device of claim 7, where each of said piston sets reciprocates approximately 45 degrees.

10. The device of claim 7, further comprising a combustion cylinder having a variable internal volume connected to each of said combustion ports.

11. The device of claim 10, where said combustion cylinder comprises a positionable end wall contained within a hollow cylinder, and where said device further comprises means to move said end wall.

12. The device of claim 11, where said means to move said end wall comprises a motor, an internally threaded gear and an externally threaded pipe connected to said end wall, where said motor is connected to said internally threaded gear to turn said internally threaded gear, which then rotates said externally threaded pipe.

* * * * *